(12) United States Patent
Wobben (10) Patent No.: US 7,204,674 B2
(45) Date of Patent: Apr. 17, 2007

(54) ROTOR BLADE FOR A WIND POWER INSTALLATION

(76) Inventor: Aloys Wobben, Argestrasse 19, Aurich (DE) D-26607

( * ) Notice: Subject to any disclaimer, the term of this patent is extended or adjusted under 35 U.S.C. 154(b) by 0 days.

(21) Appl. No.: 10/451,753

(22) PCT Filed: Dec. 20, 2001

(86) PCT No.: PCT/EP01/15106

§ 371 (c)(1),
(2), (4) Date: Nov. 25, 2003

(87) PCT Pub. No.: WO02/051730

PCT Pub. Date: Jul. 4, 2002

(65) Prior Publication Data

US 2004/0105752 A1    Jun. 3, 2004

(30) Foreign Application Priority Data

Dec. 23, 2000  (DE) ............... 100 64 912
Oct. 26, 2001  (DE) ............... 101 52 449

(51) Int. Cl.
*F03D 7/04*  (2006.01)

(52) U.S. Cl. .............. 416/1; 416/23; 416/41; 416/44; 416/48; 416/84; 416/132 B; 416/136; 416/142; 416/143; 416/240

(58) Field of Classification Search .......... 416/23, 416/84, 132, 240, 1, 24, 41, 44, 48, 132 B, 416/135–136, 142–143; 244/44, 153 R, 244/5, 123, 123.11, 219
See application file for complete search history.

(56) References Cited

U.S. PATENT DOCUMENTS 1,403,069 A * 1/1922 Burne ............. 416/132 R
2,400,388 A * 5/1946 Campbell ............. 244/113
2,428,936 A * 10/1947 Hunter ............. 244/113
2,442,783 A * 6/1948 Senn ............. 416/240
2,453,403 A * 11/1948 Bogardus ............. 244/200
2,616,509 A * 11/1952 Thomas ............. 416/84
2,622,686 A * 12/1952 Chevreau et al. ............. 416/23

(Continued)

FOREIGN PATENT DOCUMENTS

DE    31 26 677 A1    1/1983

(Continued)

*Primary Examiner*—Christopher Verdier
(74) *Attorney, Agent, or Firm*—Seed IP Law Group PLLC (57) ABSTRACT

A rotor for a wind power installation having at least one rotor blade. The smaller the surface area on which the wind acts, that is to say in particular the rotor blade area, the correspondingly lower is the load level for which installation has to be designed and the correspondingly more easily can the rotor blade be transported. On the other hand the size of the wind power installation entails minimum dimensions which are unavoidable for operation and below which the installation dimensions may not fall. In order to provide a rotor blade which on the one hand has the aerodynamically required surface area but which on the other hand is so designed that the surface area of the rotor blade and therewith the depth thereof can be reduced in predetermined situations a part of the surface of the rotor blade is deformable or movable.

9 Claims, 5 Drawing Sheets

U.S. PATENT DOCUMENTS

| | | | |
|---|---|---|---|
| 3,184,187 A * | 5/1965 | Isaac | 244/218 |
| 3,463,420 A * | 8/1969 | Butler et al. | 244/46 |
| 3,874,816 A * | 4/1975 | Sweeney et al. | 416/132 B |
| 3,987,984 A * | 10/1976 | Fischer | 244/219 |
| 4,247,253 A * | 1/1981 | Seki et al. | 416/44 |
| 4,274,011 A * | 6/1981 | Garfinkle | 416/132 B |
| 4,498,017 A | 2/1985 | Parkins | |
| 4,613,760 A | 9/1986 | Law | |
| 4,692,095 A * | 9/1987 | Lawson-Tancred | 416/23 |
| 5,096,378 A * | 3/1992 | Jamieson | 416/23 |
| 5,320,491 A * | 6/1994 | Coleman et al. | 416/24 |
| 5,527,151 A | 6/1996 | Coleman et al. | 416/23 |
| 5,570,859 A * | 11/1996 | Quandt | 416/23 |
| 5,570,997 A * | 11/1996 | Pratt | 416/132 B |
| 6,015,115 A * | 1/2000 | Dorsett et al. | 244/219 |
| 6,133,716 A | 10/2000 | Schutten | |
| 6,420,795 B1 | 7/2002 | Mikhail et al. | |
| 6,465,902 B1 | 10/2002 | Beauchamp et al. | |
| 6,523,781 B2 * | 2/2003 | Ragner | 244/153 R |
| 6,682,302 B2 * | 1/2004 | Noble | 416/1 |

FOREIGN PATENT DOCUMENTS

| | | | | |
|---|---|---|---|---|
| DE | 3913505 C2 * | 11/1989 | | 416/84 |
| DE | 40 02 972 C2 | 10/1991 | | |
| DE | 44 28 731 A1 | 2/1996 | | |
| DE | 44 35 606 A1 | 4/1996 | | |
| DE | 197 19 221 C1 | 10/1998 | | |
| EP | 0 283 730 A1 | 9/1988 | | |
| EP | 0 375 382 A2 | 6/1990 | | |
| FR | 2290585 A * | 6/1976 | | 416/132 B |
| FR | 2 587 675 A1 | 3/1987 | | |
| GB | 2 311 978 A | 10/1997 | | |
| JP | 55-153870 A * | 12/1980 | | 416/240 |
| JP | 61-140181 | 8/1986 | | |
| JP | 5-180146 | 7/1993 | | |
| SU | 577300 A * | 10/1977 | | 416/240 |
| SU | 1539378 A1 * | 1/1990 | | 416/132 B |

* cited by examiner

ROTOR BLADE FOR A WIND POWER INSTALLATION

TECHNICAL FIELD

The present invention concerns a rotor blade for a wind power installation and a wind power installation comprising at least one rotor blade according to the invention.

BACKGROUND OF THE INVENTION

Rotor blades for wind power installations are generally known and can be seen to a great extent at any wind power installation. Those rotor blades are of an external shape which takes account of the particular aerodynamic demands involved. In order to save on material and weight the rotor blades generally comprise a first internal carrier structure and a surface which encloses that first carrier structure and which is of an aerodynamically favourable configuration.

In the case of large wind power installations the rotor blades are of considerable dimensions, for aerodynamic reasons. That has an effect on the one hand on manufacture and transportation and on the other hand on the loads which act on the wind power installation in operation. They arise in particular out of the blade surface area which automatically increases with increasing size, and also the increased area swept by the rotor blades.

Wind power installations have to be designed in accordance with predetermined guidelines for given load situations. They are on the one hand the loads which occur in operation (referred to as operating loads) and on the other hand what are referred to as extreme load situations. Such extreme load situations are derived from given situations or disturbances such as for example a power network failure, a fault in blade adjustment, an extraordinarily strong gust of wind (a once-in-50-years gust etc).

In that respect it will be appreciated that the loads transmitted to the installation by the rotor blades substantially depend on the rotor blade surface area which is exposed to the wind. For calculating the extreme load, it is assumed that the entire rotor blade surface area is exposed to a maximum wind. All subsequent components such as the drive train, machine carrier, pylon, foundations etc have to be appropriately designed.

This means that, the smaller the surface area on which the wind acts, that is to say in particular the rotor blade surface area, the correspondingly lower is the load level for which the installation has to be designed. That also signifies a lower level of material expenditure and thus lower costs.

It will be appreciated however that in conflict with those considerations are a minimum surface area size required for aerodynamic reasons, in order to be able to apply the necessary forces for operation of the wind power installation—for rotating the generator. In that respect, the known rotor blades suffer from the disadvantage that, in particular in the region near the blade root, the rotor blade depth required also increases with an increasing rotor blade size. That rotor blade depth in that case becomes so great that on-road transport of such a rotor blade is already no longer possible or is possible only at incomparably high cost.

SUMMARY OF THE INVENTION

Therefore one object of the invention is to provide a rotor blade which has the aerodynamically required surface area.

In accordance with one aspect, a rotor blade for wind power installation has a surface area which is exposed to wind during operation and means for varying a size of the surface area wherein the size of the surface area is changed in certain portions of the rotor blade such that a cross-section shape of the rotor blade is varied, wherein the variation of the cross-section shape of the rotor blade is performed during at least one of an extreme wind situation and a transportation of the rotor blade.

The invention is based on the realisation that a given rotor blade area (nominal area) is required in normal operation of the wind power installation while that nominal area is under some circumstances too great in an extreme wind situation and for example in a transport situation.

In accordance with the invention therefore it is proposed that a rotor blade of the kind set forth in the opening part of this specification is developed in such a way that a part of the surface is actively deformable or movable.

In a preferred embodiment of the invention a part of the surface is formed from a deformable material which is part of a closed container. That closed container can be filled for example with a gaseous medium, wherein that gaseous medium is acted upon by a predeterminable pressure. That affords a partially inflatable surface for the rotor blade, which can be vented during transportation or when an extreme wind occurs, and thus takes up less space or yields under the pressure of the wind. In that way, the effective surface area of the rotor blade and thus the area for the wind to act thereon are reduced. At the same time the loading on the subsequent components including the pylon is reduced.

In a particularly preferred embodiment of the invention the rotor blade has a second carrier structure which is movable on itself and/or in itself.

In that case the deformable material can be fixed to predetermined locations of said second carrier structure. In addition the deformable material can be fixed with one side to a rotatable winding core.

Now in normal operation of the wind power installation the second carrier structure can be extended, that is to say folding arms can be completely stretched or telescopic arms can be fully extended. The deformable material can be secured with one side to a rotatable winding core. If now the rotor blade area is to be reduced, the winding core is rotated—similarly to an awning or sun blind—in such a way that it winds on the deformable material. At the same time the folding arms are folded and reduce the size of the second carrier structure in the region of the decreasable surface area so that the surface area of the rotor blade is correspondingly reduced.

In an alternative embodiment of the invention a part of the surface of the rotor blade comprises bar-like or lamellar strips which are respectively arranged on a carrier rail pivotable about its own longitudinal axis. In that arrangement the blades are so oriented in normal operation that they enlarge the aerodynamically operative surface area of the rotor blade. For transportation and/or when extreme loads are involved, the carrier rails can be pivoted in such a way that the blades move for example into the wind shadow of the remaining rotor blade and the surface area of the rotor blade is reduced in that way.

In a particularly preferred development of the invention a movable part of the aerodynamically operative surface of the rotor blade comprises a single surface element which is displaceable in the direction of the depth of the rotor blade. In normal operation that surface element prolongs the surface of the rotor blade, preferably at the suction side, in order to provide a large, aerodynamically operative surface.

To reduce the surface area, that surface element can be displaced, comparably to the flap system of an aircraft wing, in such a way that either it is pushed into the rotor blade and is thus covered by the remaining surface of the rotor blade, or it is pushed on to the surface of the rotor blade and in its turn covers the surface of the rotor blade. At any event that provides for a reduction in the surface area of the rotor blade.

In an alternative embodiment of the invention that surface element can be pivotably mounted at one side to the first carrier structure or the trailing edge of the rotor blade. For the purposes of varying the size of the rotor blade surface area, the element can be pivoted about that pivot axis either towards the suction side or towards the pressure side of the rotor blade.

In that arrangement, a pivotal movement of the surface element through about 90° provides that the element is disposed substantially perpendicularly to the direction of the air flow at the rotor blade and deploys a corresponding braking effect as it forms an obstacle to the air flowing along the surface of the rotor blade.

BRIEF DESCRIPTION OF THE INVENTION

A plurality of embodiments according to the invention are described in greater detail hereinafter with reference to the accompanying drawings in which:

FIG. 9 is a plan view of a structural variant of a rotor blade according to the invention.

FIGS. 9a–14 show various embodiments of the invention.

DETAILED DESCRIPTION OF THE INVENTION

Figure 1:
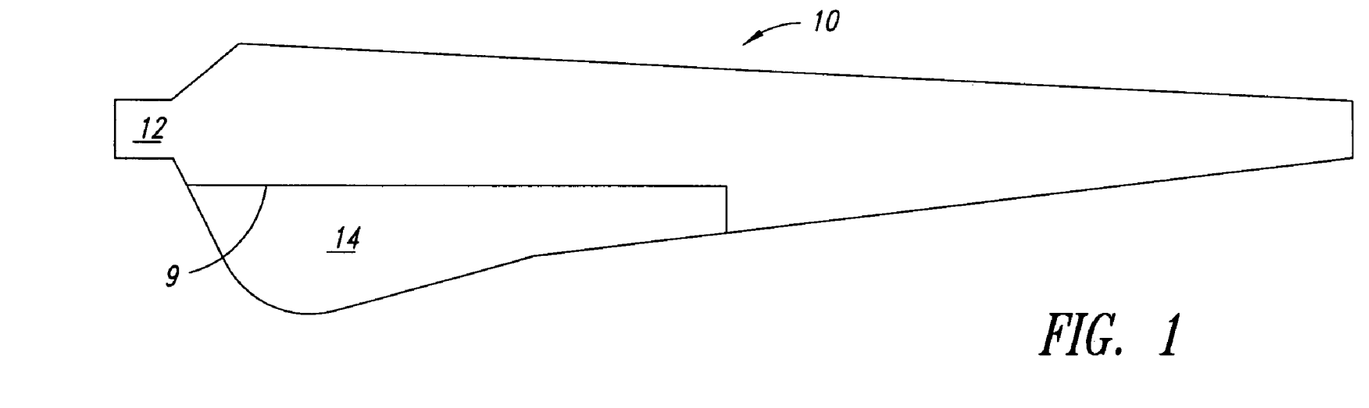
FIG. 1 shows a plan view of a complete rotor blade according to the invention.

FIG. 1 shows in simplified form a plan view of a complete rotor blade according to the invention. The rotor blade 10 is divided into two regions. In this case the rotor blade 10 is of a conventional structure in its essential parts. However, in a region adjacent to the rotor blade root 12, namely the region of the largest blade depth, it is possible to see that the rotor blade is divided. That division 9 marks the region of the rotor blade 14 whose surface area can be reduced if required and can thus be withdrawn from the action of the wind thereon.

Figure 2:
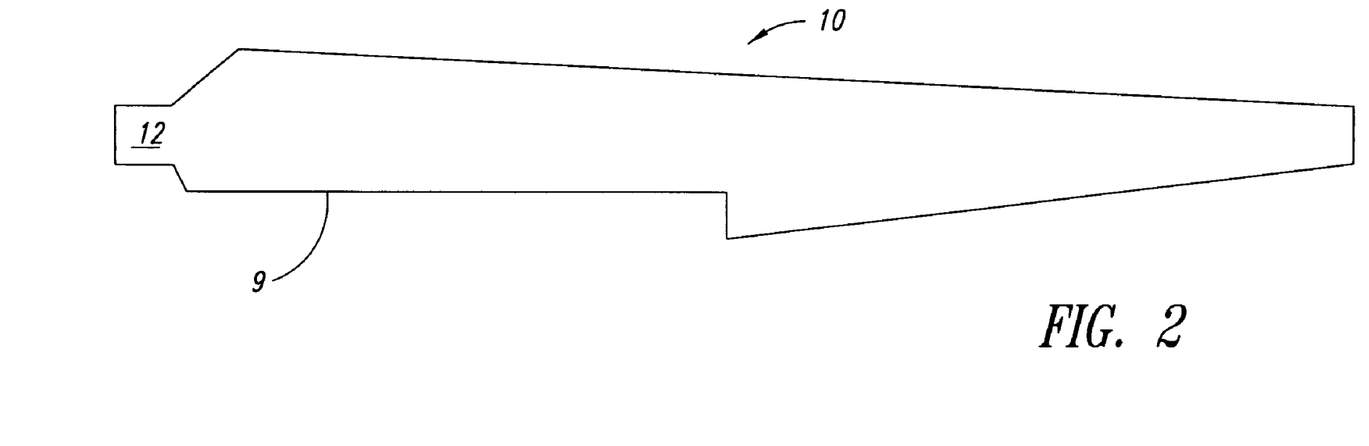
FIG. 2 shows a plan view of the front part of a rotor blade according to the invention.

The fixed part of the rotor blade 10, the surface area of which remains unchanged, is shown in FIG. 2. As can be clearly seen from FIG. 2 the aerodynamically operative surface of the rotor blade 10 is markedly reduced, and thereby also the loading, particularly in extreme wind situations, is markedly less than in the case of a rotor blade which is constructed in conventional manner.

Figure 3:
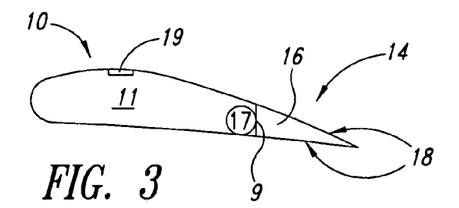
FIG. 3 shows a simplified cross-sectional view of a first embodiment of a rotor blade according to the invention.

FIG. 3 shows a simplified cross-sectional view of a first embodiment according to the invention. In this case the rotor blade 10 is divided into a front region 11 and a rear box 14. The rear box 14 comprises two webs of deformable material 18 which together with the rear wall 9 of the front region 11 form a closed container 16. When now that closed container 16 is filled under pressure with a gaseous medium the deformable material 18 forms a part (identified in FIG. 1 by reference numeral 14) of the surface, which is aerodynamically operative in normal operation, of the rotor blade 10 according to the invention.

A suitable choice of the filling pressure affords such a stability in respect of that part of the rotor blade 10 that it deploys its normal action, under normal wind conditions. In an extreme wind situation however the wind pressure on that part of the rotor blade 10 is greater so that then the external pressure is higher than the internal pressure, and this therefore entails deformation of the rotor blade in the region of the rear box 14 and the rotor blade yields to the external wind pressure. As a result, the surface area on which that extreme wind acts is reduced and thus the loads on the subsequent structural components are reduced. It should additionally be stated that this part of the rear box (in which the filling medium is disposed) can be actively emptied for example when a predetermined wind speed is exceeded, in order to reduce the surface area of the rotor blade. That active emptying has the advantage that the shape of the rotor blade is defined at any time while indefinite situations can occur when the rear box yields as a consequence of the external pressure.

In order to avoid damage in particular to the container 16, it is possible to provide for example a pressure relief valve (not shown) through which an increased pressure formed in the container 16 can escape.

The pressure required for normal operation can be restored by the use of a compressor 17. If moreover controllable valves and/or pressure sensors (also not shown) are provided, the filling pressure in the container 16 can also be consequentially adjusted in the event of fluctuations in the wind pressure in order always to maintain optimum operating conditions in that way.

Figure 4:
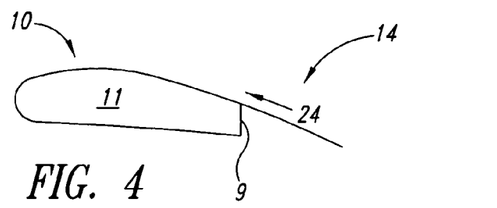
FIG. 4 shows a simplified cross-sectional view of a second embodiment of a rotor blade according to the invention.

FIG. 4 shows a second embodiment of the present invention, in which the surface of the suction side of the rotor blade 10 is prolonged, instead of involving a complete rear box 14. That prolongation is a surface element 24 which adjoins the surface of the front region 11.

For the purposes of reducing the aerodynamically operative surface area the surface element 24 can be displaced in the direction of the arrow. That displacement can be effected for example hydraulically, namely with suitable hydraulic cylinders, pneumatically, with pneumatic cylinders, by electrical drives, or in another suitable fashion. It will be appreciated that suitable pumps, compressors or drives (actuators) have to be provided for that purpose, but they are not shown in the Figure for the sake of simplicity.

In this arrangement such displacement can take place into the front region so that the surface of the front region 11 covers over the surface element 24. Alternatively the displacement can also take place on the surface of the front region 11 so that the surface element 24 in turn covers over the corresponding part of the surface of the front region 11. In both cases this involves a reduction in the aerodynamically operative surface of the rotor blade 10.

Figure 5A:
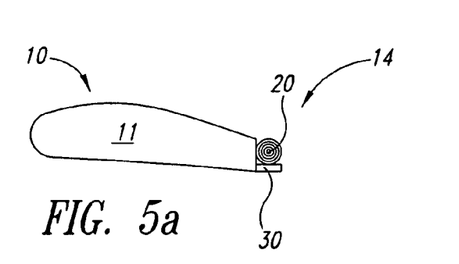
FIGS. 5a, 5b show a simplified cross-sectional view of a third embodiment of a rotor blade according to the invention.
Figure 5B:
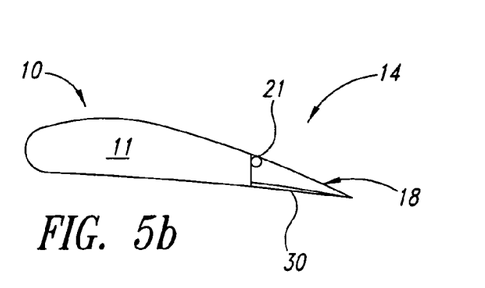

A third embodiment of the present invention is shown in FIGS. 5a and 5b. FIG. 5a shows a winding 20 of a deformable material and reference numeral 30 denotes folding arms which are in the folded condition. The mechanism here can be comparable to that of an awning.

FIG. 5b shows this embodiment in the condition involved in normal operation. The folding arms 30 are extended and, as the deformable material 18 is secured thereto, it was unwound from the coil 20 upon extension of the folding arms 30 so that the winding core 21 now no longer carries the entire winding of material.

In that unwound situation the deformable material 18 is secured on the one hand to the winding core 21 and on the other hand to the ends of the folding arms 30, which face towards the right in the Figure. Those ends of the folding arms 30 can in turn be connected by a bar (not shown) in order on the one hand to achieve a higher level of strength for the structure and on the other hand to fix the deformable material there.

In order to prevent the deformable material 18 from yielding between the winding core 21 and the outer ends of the folding arms 30 it is possible to provide beneath the deformable material a scissor trellis-like device which is actuated synchronously with the folding arms 30 and which supports the deformable material 18 in the extended state.

A reduction in the operative surface area takes place in the reverse fashion: the folding arms 30 and the scissor trellis arrangement (not shown) are retracted (folded) and at the same time the deformable material 18 is wound on the winding core 21 so that finally the winding core 20 is again in the condition shown in FIG. 5a and the operative surface area of the rotor blade 10 is reduced.

Figure 6:
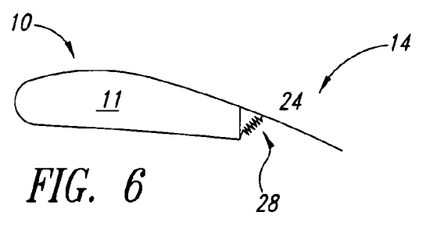
FIG. 6 shows a simplified cross-sectional view of a fourth embodiment of a rotor blade according to the invention.

In a fourth embodiment of the invention as shown in FIG. 6 the surface element 24 is mounted pivotably at the rear side of the front region 11 and thus prolongs the suction side of that front region 11. In this case the surface element 24 is supported by a compression spring 28 disposed between the surface element 24 and the carrier structure of the front region 11.

In normal operation that compression spring 28 supports the surface element 24 in such a way that it retains the desired position. If now there is a wind pressure on the top side of the rotor blade 10, beyond the normal operating conditions, the pressure on the surface of the surface element 24 rises and overcomes the force of the spring 28 so that the surface element 24 is pressed downwardly in FIG. 6 and therefore yields to the wind pressure and thus the aerodynamically operative surface area is correspondingly reduced.

It will be appreciated that, as an alternative to the spring 28, it is also possible to provide corresponding telescopic elements such as hydraulic or pneumatic devices or mechanical devices for active displacement of the surface element, for example it is possible to use screwthreaded bars and worm drives or the like in order to hold the surface element 24 in a first predetermined position or to move it into a second predetermined position. It will be appreciated that actuation of those control members requires the provision of suitable pumps, compressors or drives which are again not shown in this Figure for the sake of clarity of the drawing.

Equally it is again possible to detect the wind load which acts on the surface element 24 and the surface element can then be pivoted about the pivot axis in dependence on that detected wind load in order to provide a setting which is the optimum for the instantaneous operating conditions.

Figure 7:
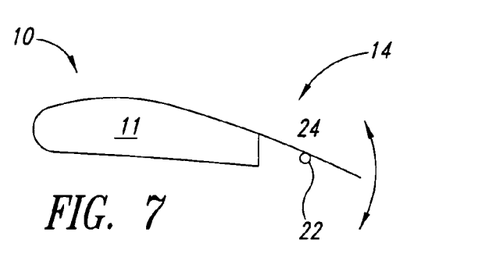
FIG. 7 shows a simplified cross-sectional view of a fifth embodiment of a rotor blade according to the invention.

FIG. 7 shows a fifth embodiment of the invention. In this fifth embodiment, instead of the surface element 24 being pivotably mounted to the rear side of the front region 11, the surface element 24 is arranged on a pivot spindle 22 which is rotatable about its own longitudinal axis. In the position shown in FIG. 7 the surface element 24 again prolongs the aerodynamically operative surface of the rotor blade 10.

Now, to reduce that operative surface, the pivot spindle 22 with the surface element 24 secured thereto is rotated about its longitudinal axis in such a way that the outer end of the surface element 24 moves in one of the two directions indicated by the double-headed arrow. That in turn results in a reduction in the aerodynamically operative surface area of the rotor blade 10 and, concomitantly therewith, a variation in the wind load on the rotor blade 10 and all subsequent components of the wind power installation.

Figure 8A:
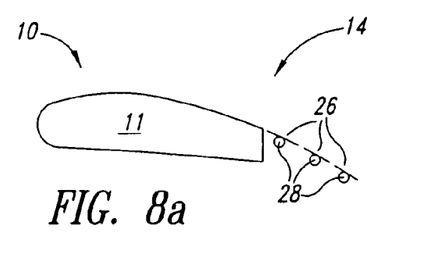
FIGS. 8a, 8b are simplified cross-sectional views of a sixth embodiment of a rotor blade according to the invention.
Figure 8B:
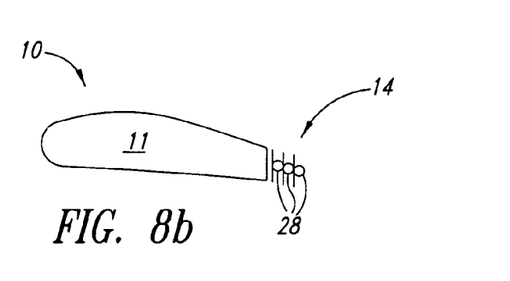
Figure 9A:
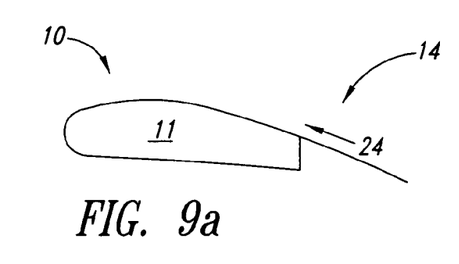
Figure 9B:
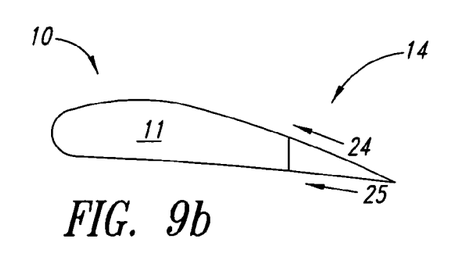
Figure 10A:
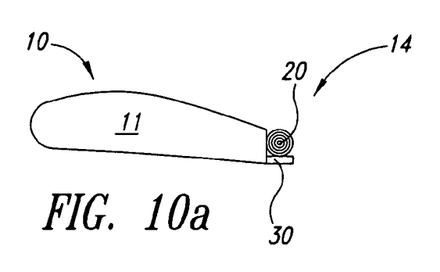
Figure 10B:
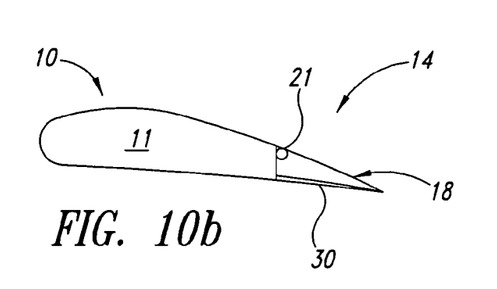

A variant of the embodiment shown in FIG. 7 is illustrated in FIGS. 8a and 8b. In this case the surface element denoted by reference 24 in FIG. 7 is divided in FIG. 8a into three blade-like or lamellar elements 26. They are deliberately shown in FIG. 8a at a spacing in order to clearly show that division. In an actual embodiment, as will be appreciated, those three elements are arranged in such a way that they forth a surface which is as closed as possible and which in turn as smoothly as possible adjoins the front region 11 of the rotor blade 10.

Each of the blades 26 is arranged on its own pivot spindle. Each of those pivot spindles 28 is rotatable about its own longitudinal axis and thus permits pivotal movement of the blades 26 by rotation of the pivot spindle 28 about the longitudinal axis.

FIG. 8b shows the apparatus according to the invention in the situation in which the blades are pivoted in such a way that the aerodynamically operative surface of the rotor blade 10 is reduced. In this case the blades 26 are pivoted into the flow shadow of the front region 11. As a result on the one hand they no longer act as rotor blade surface area, but on the other hand they are also removed from the action of the wind thereon and are thus not exposed to elevated levels of loading thereon.

Such an arrangement is achieved insofar as, besides rotation of the pivot spindles 28 about their longitudinal axes, the spacing between the pivot spindle 28 which is at the left in the Figure and the front region 11 of the rotor blade 10 on the one hand and between the pivot spindles 28 on the other hand is reduced.

Insofar as the Figures only show a prolongation of the suction side of the surface, it will be appreciated that alternatively or in addition the surface of the pressure side can be correspondingly altered.

If a wind power installation is provided with the described rotor blades, it is possible that, when an extreme wind situation occurs, not only is the great wind strength detected, which can be effected by wind speed measuring units 19, but that the size of the surface area of the rotor blade is then also markedly reduced by suitable control. As shown in FIGS. 1 and 2 for example the area of the rotor blade shown in FIG. 1 is more than 10% larger than the surface area of the rotor blade shown in FIG. 2. While the normal size of the rotor blade is set in nominal operation of the wind power installation, for example at a wind speed in the range of between 2 and 20 m/s wind speed, the size of the surface area can be reduced at a wind speed of above 20 m/s so that the size of the surface area decreases markedly, as shown in FIG. 2.

The control system is preferably computer-aided and if necessary provides for the respectively optimally set surface area for the rotor blade.

Further FIGS. 9a to 14 show further alternative or supplemental embodiments in relation to preceding FIGS. 3 to 8b.

Figure 14:
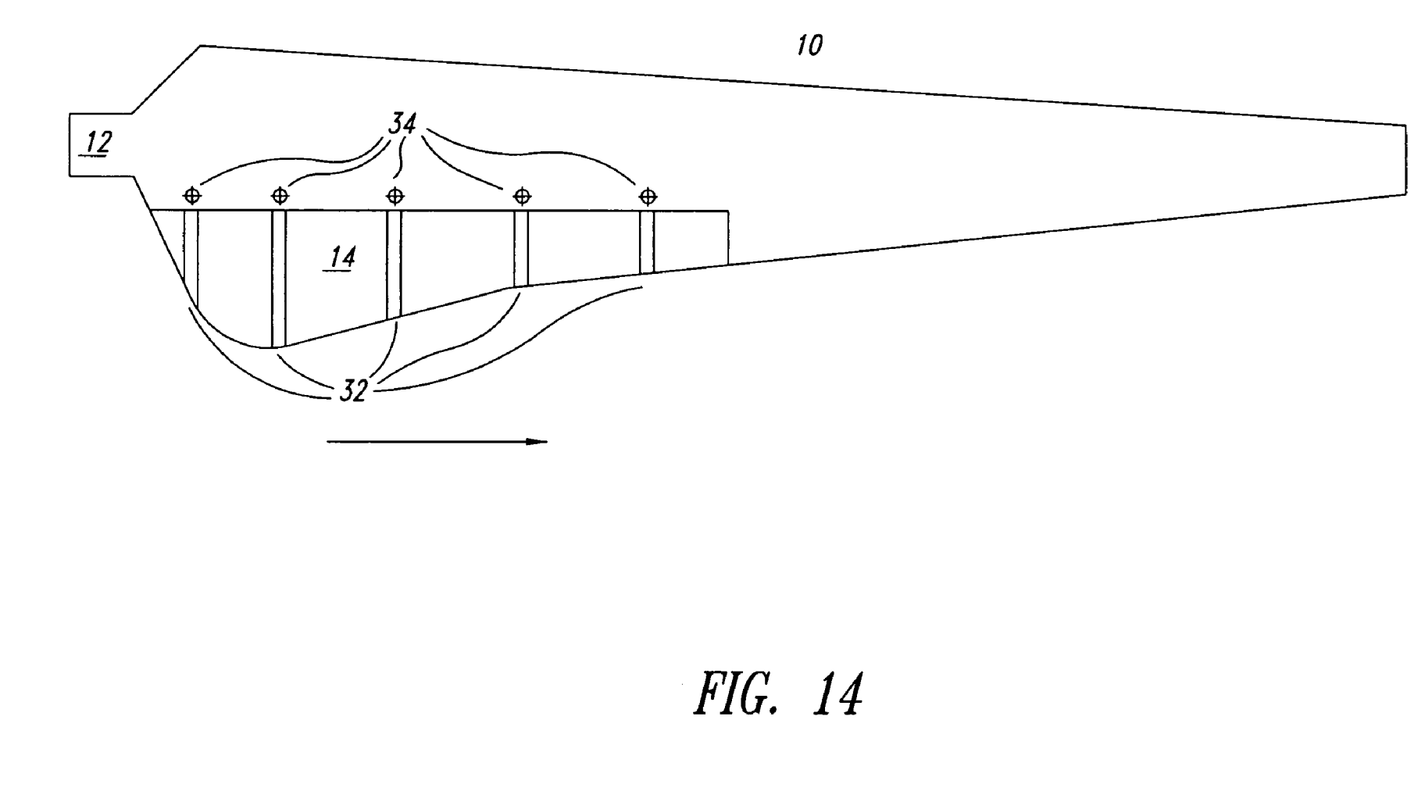

FIG. 14 shows a further structural variant of a rotor blade according to the invention. In this case the structure is built up by pivotable loops 32 which can be covered by a film which is again deformable, and are mounted pivotably at mounting points 34. By virtue of a movement in the direction of the tip of the rotor blade (indicated by the arrow) those pivotal loops can now be pivoted for example about the mounting points 34 and thus alter the rear box profile.

Figure 11A:
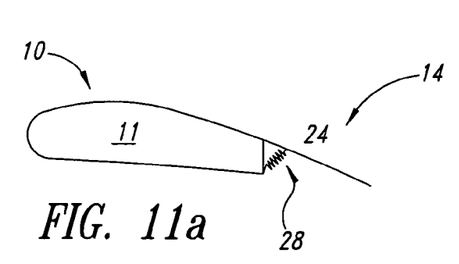
Figure 11B:
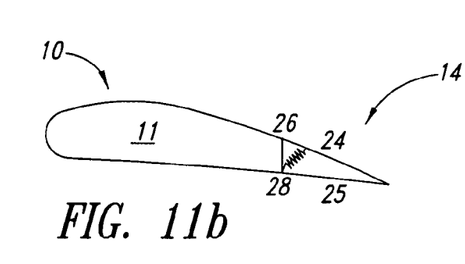

FIG. 11*b* (FIG 11*a* substantially corresponds to FIG. 6), as a supplemental consideration in relation to FIG. 6, shows an element 25 at the pressure side. As the point of engagement for the spring 28 has not been modified in comparison with the views in FIG. 6 and FIG. 11*a* respectively, the elements 24 and 25 must hang together at the trailing edge of the blade so that they are pivotable about a pivot mounting point 26. Under some circumstances it is appropriate with this structure to provide for overlapping by the rotor blade box 11 over the element 25 along the length of the rotor blade.

Figure 12A:
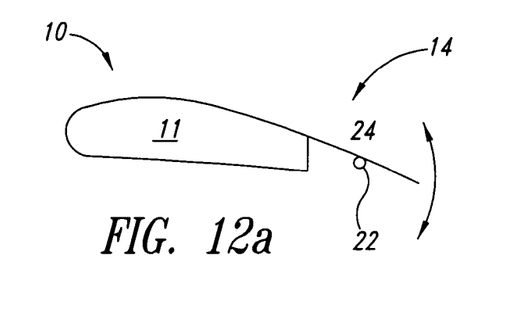
Figure 12B:
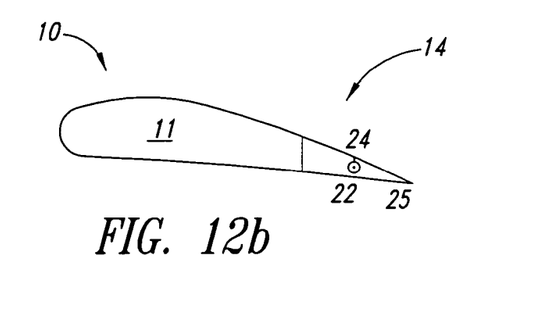

FIG. 12*b* (an enlargement of what is shown in FIG. 7 and FIG. 12*a* respectively) also illustrates a pressure-side element 25 which in the illustrated case is fixed by way of a mechanical connection like the suction-side element 24 to a common shaft 12.

Figure 13A:
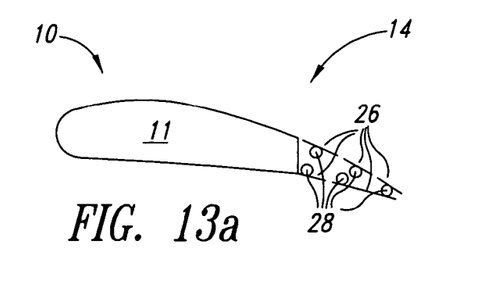
Figure 13B:
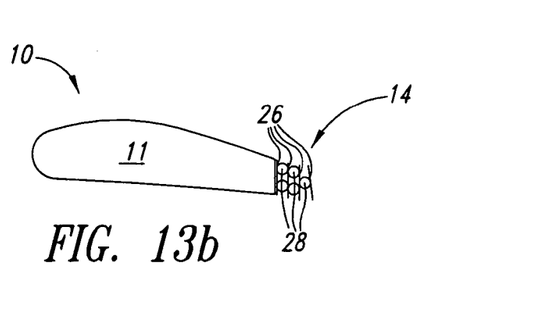

FIGS. 13*a* and 13*b* show a development of what is already illustrated in FIGS. 8*a* and 8*b*. In this case in part specific shafts 28 are illustrated for corresponding elements on the pressure side. Similarly to FIG. 8*a*, FIG. 13*a* shows a rotor blade in normal operation. FIG. 13*b* shows a situation in which the rear box is no longer operative, by virtue of corresponding rotation or by virtue of displacement of the shafts 28.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind power installation rotor blade comprising a surface area which is exposed to wind during operation and means for varying a size of the surface area, wherein the size of the surface area is changed in certain portions of the rotor blade such that a cross-section shape of the rotor blade is varied, wherein the means for varying the size of the surface area includes a deformable part of the surface area, wherein the deformable part includes an inflatable closed container, wherein the size of the closed container and the size of the surface area are reduced during an extreme wind situation.

2. The wind power installation rotor blade according to claim 1, further comprising a control means for controlling the means for varying the size of the surface area.

3. The wind power installation rotor blade according to claim 2, further comprising a wind speed detecting means coupled to the control of the means wherein the control means is configured to respond to a wind strength of more than 20 m/s by causing the means for varying the size of the surface area to reduce the size of the surface area of the rotor blade.

4. A wind power installation rotor blade comprising:
a fixed surface area;
a variable surface area with an inflatable member; and
a control assembly to control a size of the inflatable member, wherein the inflatable member is configured to have a first size when exposed to a normal operating wind situation and have a second size when exposed to an extreme wind situation wherein the second size of the inflatable member is smaller than the first size of the inflatable member, reducing a size of the variable surface area during the extreme wind situation.

5. The wind power installation rotor blade according to claim 4, wherein the variable surface area with the inflatable member is arranged at a rear side of the rotor blade.

6. The rotor blade of claim 5 wherein the inflatable member is configured to inflate in response to a gas.

7. The rotor blade of claim 4, further comprising a detection device in communication with the control assembly to detect a wind speed.

8. The wind power installation rotor blade according to claim 4 wherein reducing the size of the variable surface area includes decreasing an internal pressure within the variable surface area.

9. A method of operation of a wind power installation, the method comprising:
in response to detection of a first wind situation being a normal operating wind situation, configuring a variable surface area portion of a wind power installation rotor blade having an inflatable member, to have a first size; and
in response to detection of a second wind situation being an extreme wind situation, configuring the variable surface area portion of the wind power installation rotor blade to have a second size, wherein the second size is smaller than the first size.

* * * * *